United States Patent
Zami

(10) Patent No.: US 7,020,356 B2
(45) Date of Patent: Mar. 28, 2006

(54) SELECTION MODULE FOR AN OPTICAL SIGNAL SWITCH AND AN OPTICAL SIGNAL SWITCH

(75) Inventor: Thierry Zami, Massy (FR)

(73) Assignee: Alcatel, Paris (FR)

( * ) Notice: Subject to any disclaimer, the term of this patent is extended or adjusted under 35 U.S.C. 154(b) by 84 days.

(21) Appl. No.: 10/779,732

(22) Filed: Feb. 18, 2004

(65) Prior Publication Data

US 2004/0175069 A1    Sep. 9, 2004

(30) Foreign Application Priority Data

Mar. 4, 2003  (FR) .................................. 03 02603

(51) Int. Cl.
*G02B 6/26* (2006.01)

(52) U.S. Cl. ........................ 385/16; 398/100

(58) Field of Classification Search ............ 385/15–19, 385/24; 398/45, 79, 100, 101; 396/104, 396/115, 118
See application file for complete search history.

(56) References Cited

U.S. PATENT DOCUMENTS 5,365,358 A * 11/1994 Stein ........................... 398/55
5,495,356 A *  2/1996 Sharony et al. ............... 398/46

2002/0071157 A1 *  6/2002 Sauze et al. ................. 359/128

OTHER PUBLICATIONS

Habara K et al: "Large-Capacity Photonic Packet Switch Prototype Using Wavelength Routing Techniques" IEICE Transactions on Communications, Institute of Electronics Information and Comm. Eng. Tokyo, JP, vol. E83-B, No. 10, Oct. 2000, pp. 23047-23110, XP001065342.

Hu W S et al: "Multicasting Optical Cross Connects Employing Splitter-and-Delivery Switch" IEEE Photonics Technology Letters, IEEE Inc. New York, US, vol. 10, No. 7, Jul. 1, 1998, pp. 970-972, XP000771730.

Mino S et al: "Q-Factor-Based Level Dsigne for Photonic ATM Switches" IEICE Transactions on Communications, Institute of Electronics Information and Comm. Eng. Tokyo, JP, vol. E-82B, No. 2, Feb. 2, 1999, pp. 288-297, XP00094017.

* cited by examiner

Primary Examiner—Akm Enayet Ullah
(74) Attorney, Agent, or Firm—Sughrue Mion, PLLC

(57) ABSTRACT

A selection module for use in an optical signal switch comprises a spatial selector comprising a plurality of inputs each receiving a wavelength division multiplexed optical signal comprising a plurality of channels each associated with a separate wavelength, an output delivering a single signal selected from the plurality of wavelength division multiplexed signals, and a plurality of spectral selectors each selecting a channel from a plurality of channels of the signal selected by the spatial selector.

11 Claims, 3 Drawing Sheets

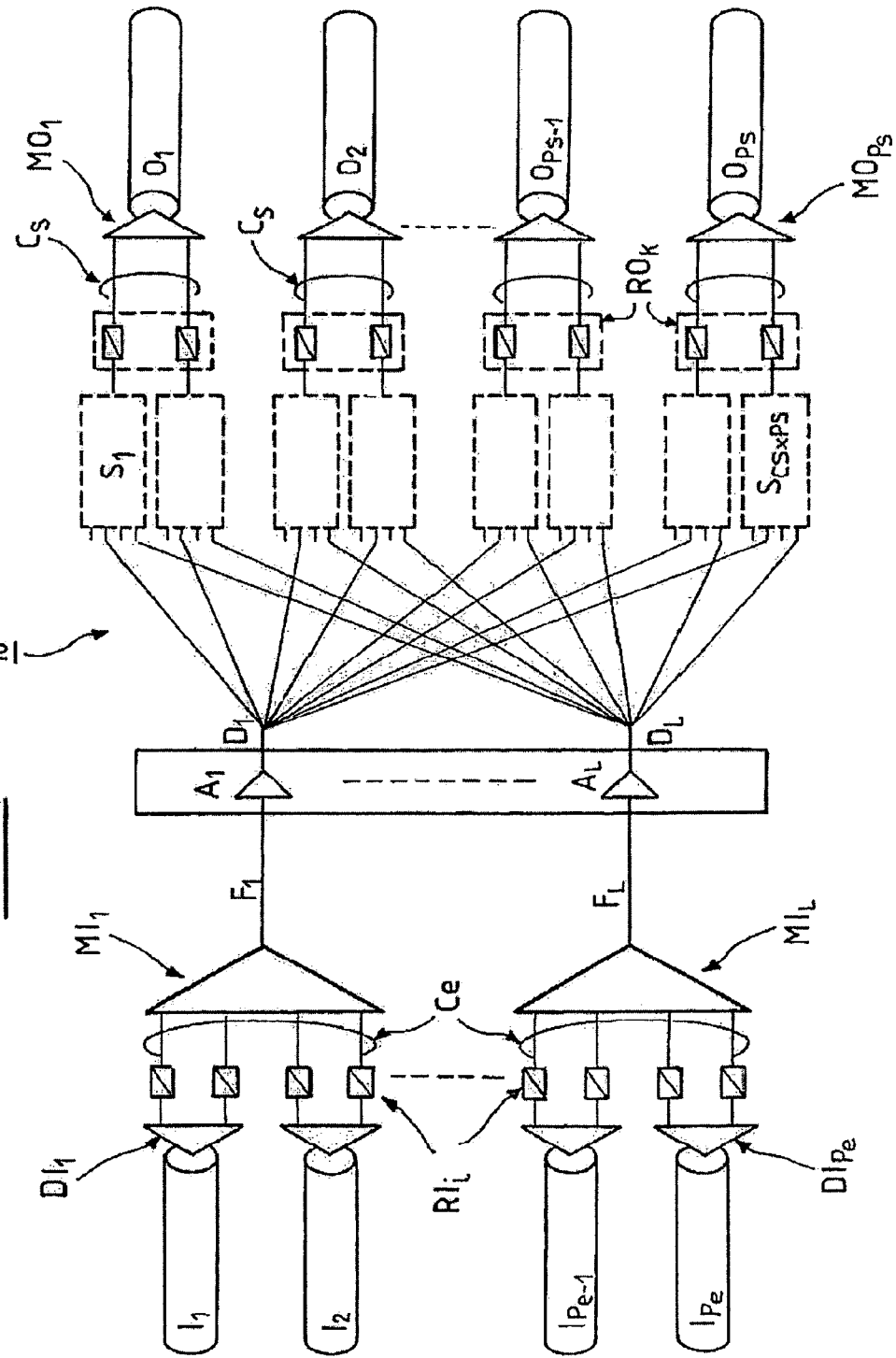

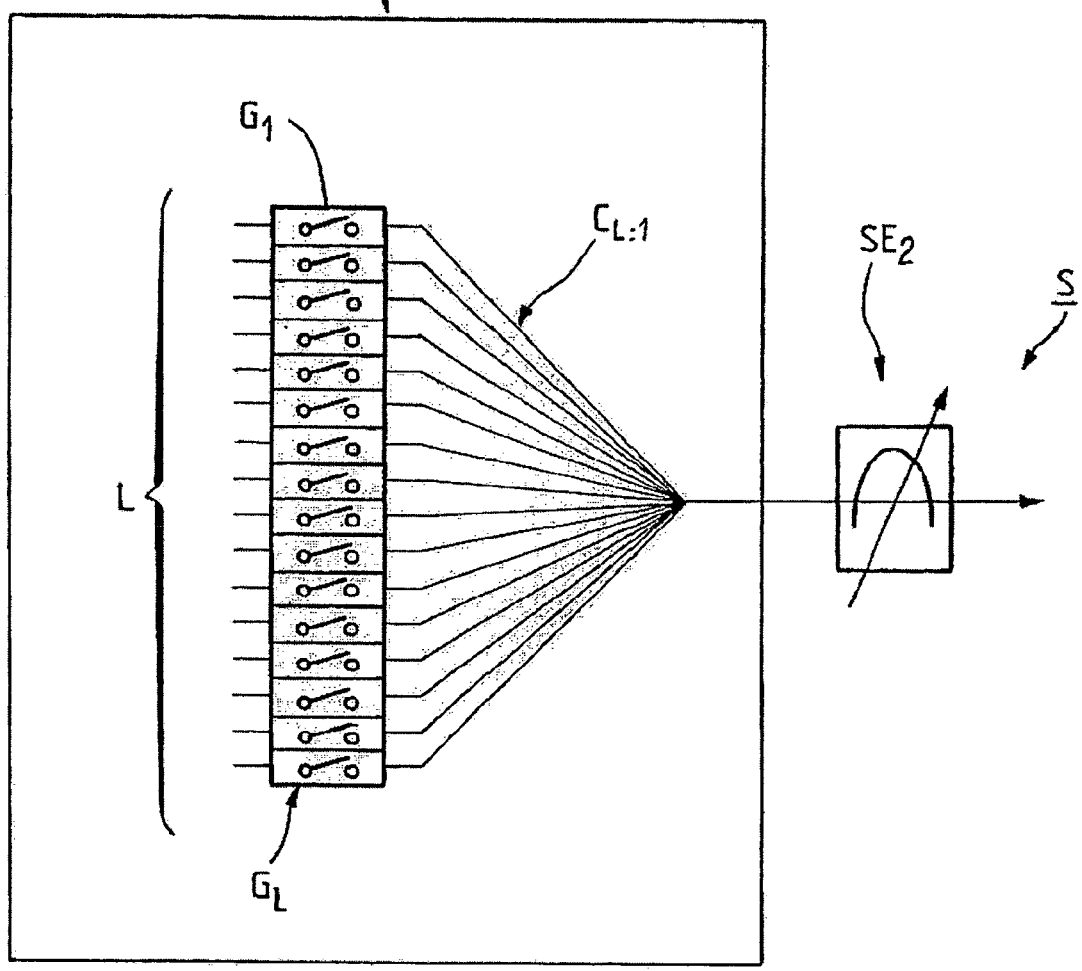

FIG_3
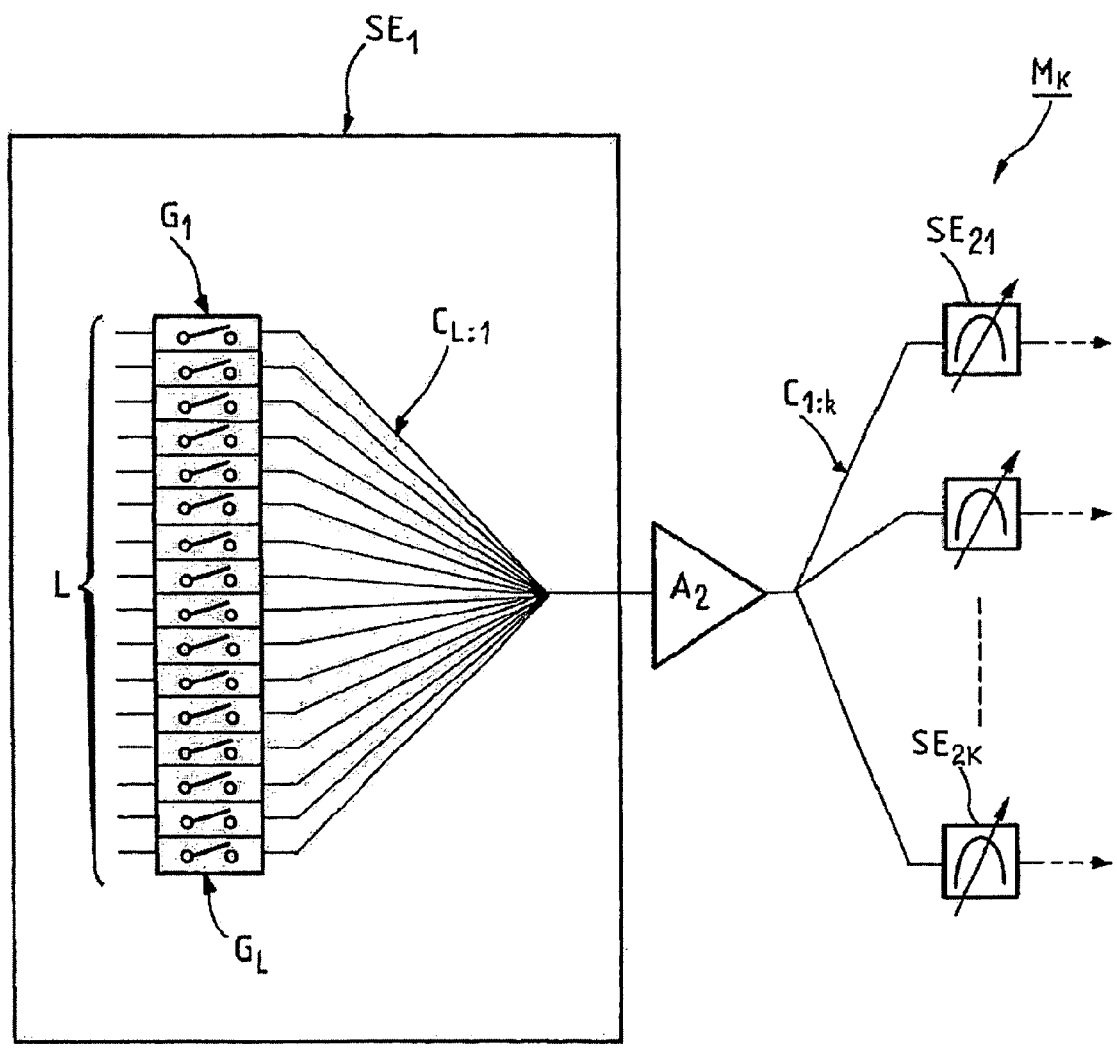

SELECTION MODULE FOR AN OPTICAL SIGNAL SWITCH AND AN OPTICAL SIGNAL SWITCH

CROSS-REFERENCE TO RELATED APPLICATIONS

This application is based on French Patent Application No. 03 02 603 filed Mar. 4, 2003, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a selection module for an optical signal switch.

2. Description of the Prior Art

Telecommunications is expanding greatly. More and more users (private persons and companies) are transmitting over telecommunication networks more and more messages containing more and more information, for example when sending pictures. To satisfy this growing information bit rate demand, telecommunication network operators are adopting optical signal transmission involving modulation of optical signals, generally produced by lasers, in accordance with the information to be transmitted, followed by propagation of the modulated signals over a network of optical waveguides or optical fibers.

Optical signal transmission has a number of advantages. In particular, optical signals are attenuated less during transmission than electrical signals and optical fibers are mechanically stronger and lighter than their electrical counterparts. However, the main advantages are the high bandwidth of optical fibers and the ability to transmit a plurality of carriers with different wavelengths simultaneously in the same fiber. This latter technique, known as wavelength division multiplexing, provides information bit rates of the order of 1 gigabit/s and even 1 terabit/s.

In parallel with wavelength division multiplexing, time division multiplexing enables the simultaneous transmission of a plurality of calls on the same carrier because each carrier transmits packets relating to different messages whose information content has been divided between the packets, which are sent over the network with a header indicating their destination. When the packet passes through a switch, the latter locks its physical resources for the time needed to route the packet to the requested output. Those resources are then freed to switch another packet. As the packets have a limited time duration, of the order of 1 microsecond, many calls can be transmitted in a short time period. This routing policy is currently used by the largest Internet Protocol networks.

The multitude of signals transmitted by the networks necessitates the introduction of switches for directing the signals received at a plurality of inputs, corresponding to a first set of optical fibers, to a plurality of outputs, corresponding to a second set of optical fibers. By controlling them appropriately, some switches, known as broadcast and select switches, broadcast a signal coming from an input and select the output of the switch to which the signal is sent.

FIG. 1 shows a broadcast and select switch 10.

The switch 10 comprises:

$P_e$ input ports each connected to an input fiber $I_j$ (j varying from 1 to $P_e$), $P_e$ demultiplexers $DI_1$ to $DI_{Pe}$, $L \times C_e$ optical regenerators $RI_j$ (i varying from 1 to $L \times C_e$), L multiplexers $MI_1$ to $Mi_L$, L amplifiers $A_1$ to $A_L$, L couplers $D_1$ to $D_L$, Cs×Ps selection modules $S_1$ to $S_{Cs \times Ps}$, Cs×Ps optical regenerators $RO_k$ (k varying from 1 to Cs×Ps), $P_s$ multiplexers $MO_1$ to $MO_{Ps}$, and $P_s$ output ports each connected to an output fiber $O_m$ (m varying from 1 to Ps).

Each input port receives on one of its input fibers $I_j$ a wavelength division multiplex (WDM) signal.

The WDM signals are demultiplexed by the $P_e$ demultiplexers $DI_1$ to $DI_{Pe}$.

The demultiplexed signals are then regenerated by the optical regenerators $RI_j$, which amplify and reshape the optical pulses of the signals. The optical regenerators $RI_j$, can also modify the wavelength associated with each signal.

The regenerated signals are then multiplexed by the L multiplexers $MI_1$ to $MI_L$, each multiplexer having $C_e$ inputs and supplying at its output a signal $F_t$ (t varying from 1 to L).

a plurality of optical switches such as semiconductor optical amplifiers each having an input connected to an output of the demultiplexer and an output connected to an input of the multiplexer.

Referring to FIG. 1, each of the Cs×Ps selection modules $S_1$ to $S_{Cs \times Ps}$ selects a particular signal $F_t$ and extracts therefrom a particular channel that is sent to one of the Cs×Ps optical regenerators $RO_k$.

The channels intended for an output fiber $O_m$ (m varying from 1 to $P_s$) are first multiplexed by one of the $P_s$ multiplexers $MO_1$ to $MO_{Ps}$ each having $C_s$ inputs and an output connected to one of the $P_s$ output ports.

Certain problems are encountered with a switch of the above kind, however.

The switch implies a large number of optical gates for implementing the selection modules. Each of the Cs×Ps output gates ahead of multiplexing toward the output fibers implies a selection module, and thus a spatial selector and a spectral selector for selecting a channel, both these selectors comprising a large number of optical switches. This large number of optical switches implies not only high cost but also high power consumption and a large overall size of the switch.

The present invention aims to provide a selection module for switching optical signals whereby the number of optical gates used in said switch can be reduced and the overall power consumption and the overall size of the switch reduced accordingly.

SUMMARY OF THE INVENTION

To this end the invention proposes a selection module for use in an optical signal switch, the module comprising a spatial selector comprising a plurality of inputs each receiving a wavelength division multiplexed optical signal comprising a plurality of channels each associated with a separate wavelength, an output delivering a single signal selected from the plurality of wavelength division multiplexed signals, and a plurality of spectral selectors each selecting a channel from a plurality of channels of the signal selected by the spatial selector.

The invention exploits the fact that a plurality of optical packets during the same time interval on a given input optical fiber can be addressed to the same output fiber. The module according to the invention selects a plurality of channels, each corresponding to an optical packet, addressed to the same output fiber at the some time. A plurality of spectral selectors therefore share the same spatial selector; this sharing saves a large number of optical gates (see below).

The selection module of the invention advantageously further comprises a first optical coupler having an input connected to the output of the spatial selector and a plurality of outputs each connected to an input of one of the spectral selectors.

The spatial selector advantageously comprises a second optical coupler having a number of inputs equal to the number of inputs of the spatial selector and one output, and a plurality of optical switches each associated with one of the inputs of the optical coupler and each having an input that constitutes an input of the spatial selector and an output coupled to the associated input of the second optical coupler.

The optical switches of the spatial selector are advantageously semiconductor optical amplifiers.

Each of the spectral selectors advantageously comprises a demultiplexer comprising an input receiving the signal selected by the spatial selector and a plurality of outputs, a multiplexer comprising a plurality of inputs and an output supplying the signal associated with a channel selected from a plurality of channels of the signal selected by the space selector, and a plurality of optical switches each comprising an input connected to an output of the demultiplexer and an output connected to an input of the multiplexer.

The optical switches of the spectral selector are advantageously semiconductor optical amplifiers.

The selection module of the invention advantageously further comprises an optical amplifier for amplifying the signal selected by the spatial selector and having an input connected to the output of the spatial selector.

The present invention also provides an optical signal switch adapted to receive a plurality of wavelength division multiplex input signals and comprising output ports supplying wavelength division multiplexed output signals each comprising a plurality of channels each associated with one wavelength, each of the input signals comprising a plurality of channels each associated with one wavelength, and the switch comprising a broadcast stage comprising optical couplers associated with respective input signals, each optical coupler receiving at its input the associated input signal and broadcasting the signal toward a plurality of output ports, and a selection stage comprising a plurality of outputs, and a plurality of selection modules each having L inputs, the plurality of selection modules comprising means for selecting at one of the outputs one of the channels associated with one of the broadcast input signals, in which switch the selection stage comprises at least one selection module according to the invention.

The at least one selection module advantageously comprises n outputs each assigned to selecting one channel from a plurality of channels of the signal selected by the spatial selector, where n is an integer greater than 1 and less than Ce/Ps+1.

Thus it can be shown that there is always one set of n channels of the same input signal that will be addressed to the same output fiber, n being less than $C_e/P_s+1$. The n channels can therefore share the same spatial selector.

It is particularly advantageous if each of the $P_s$ output ports is associated with $u_k$ modules each comprising k outputs each selecting one channel from a plurality of channels of the signal selected by the spatial selector, $C_e$ being an integer multiple of $P_s$ greater than 1, k varying from 1 to $C_e/P_s$, and $u_k$ being defined by the equation:

$$u_k = E\left(\frac{C_s - v_k - L \cdot (k-1)}{k}\right) + (C_s - v_k - L \cdot (k-1)) \bmod [k]$$

where $v_k = v_{k+1} + k \cdot u_k$ and $v_{\frac{C_e}{P_s}} = 0$, the operator E( ) designating the integer part function and the $u_k$ modules being modules according to the invention for k varying from 2 to $C_e/P_s$.

Accordingly, for a given output fiber, there exists, among all the input ports of the switch associated with the input fibers, at least $U_k$ sets of k channels of the same input signal multiplexed and addressed to that given output fiber. In other words, instead of the Cs×Ps selectors of the switch shown in FIG. 1, there is a number of spatial selectors equal to $$\left(\sum_{k=1}^{\frac{C_e}{P_s}} u_k\right) \cdot P_S.$$

The switch advantageously comprises $P_s$ multiplexers each having $C_s$ inputs and one output connected to one of said $P_s$ output ports.

Other features and advantages of the present invention will become apparent in the course of the following description of one embodiment, which is provided by way of illustrative and nonlimiting example.

BRIEF DESCRIPTION OF THE DRAWINGS

FIG. 1 depicts a prior art optical switch.
FIG. 2 depicts a prior art optical switch selection module.
FIG. 3 depicts an optical switch selection module of the invention.

DETAILED DESCRIPTION OF THE PREFERRED EMBODIMENT

FIGS. 1 and 2 have been described already with reference to the prior art.

FIG. 3 depicts a selection module $M_k$ according to the invention.

The module $M_k$ comprises:
a spatial selector $SE_1$,
an amplifier $A_2$,
a coupler $C_{1:k}$, and
k spectral selectors $SE_{21}$ to $SE_{2k}$.

The spatial selector $SE_1$ comprises:
L inputs each connected to an optical gate $G_t$ (t varying from 1 to L), and
an optical coupler $C_{L:1}$ for connecting L inputs to one output.

Each optical gate $G_t$ is an optical switch such as a semiconductor optical amplifier activated only when it must transmit a signal.

Each of the L inputs receives a WDM signal comprising a plurality of channels each associated with a wavelength.

Thus the spatial selector $SE_1$ sends to its output only one of the L signals received.

The spatially selected signal is then amplified by the amplifier $A_2$ and then broadcast to the spectral selectors $SE_{21}$ to $SE_{2k}$ via the coupler $C_{1:k}$.

The coupler $C_{1.k}$ has an input connected to the output of the spatial selector and k outputs each connected to an input of one of said spectral selectors $SE_{21}$ to $SE_{2k}$.

Each of the spectral selectors $SE_{21}$ to $SE_{2k}$ selects one of the plurality of channels of the signal selected by the spatial selector $SE_1$.

The module $M_k$ therefore spatially selects a WDM signal from the L WDM signals and then extracts from the spatially selected signal k channels each corresponding to a different wavelength.

Each of the spectral selectors $SE_{21}$ to $SE_{2k}$ may comprise, for example:
- a demultiplexer having an input receiving the signal selected by the spatial selector and a plurality of outputs,
- a multiplexer having a plurality of inputs and an output supplying the signal associated with the channel selected from the plurality of channels of the signal selected by the spatial selector, and
- a plurality of optical switches such as semiconductor optical amplifiers each having an input connected to an output of the demultiplexer and an output connected to an input of the multiplexer.

These modules $M_k$ can advantageously be used in an optical switch of the type depicted in FIG. 1.

This is because it can be shown that there is always a set of n channels belonging to the same input signal to be addressed to the same output fiber, where the value of n is less than $C_e/P_s+1$. The n channels can therefore share the same spatial selector.

To be more precise, for a given output fiber, there exist, among all the input ports of the switch associated with the input fibers, at least $u_k$ sets of k channels coming from the same input port and addressed to the given output fiber, where $u_k$ is defined by the following equation:

$$u_k = E\left(\frac{C_s - v_k - L \cdot (k-1)}{k}\right) + (C_s - v_k - L \cdot (k-1)) modulo[k]$$

where $v_k = v_{k+1} + k \cdot u_k$ and $v_{\frac{Ce}{Ps}} = 0$, with k varying from 1 to $C_e/P_s$.

Each of the $P_s$ output ports can be associated with $u_k$ selection modules $M_k$ (k varying from 1 to $C_e/P_s$) i.e. the total number of modules per output port is equal to $$\left(\sum_{k=1}^{\frac{Ce}{Ps}} u_k\right).$$

The module $M_1$ designates a prior art selection module such as the module S shown in FIG. 2.

In a switch comprising selection modules according to the invention, instead of the Cs×Ps spatial selectors of the switch depicted in FIG. 1, the number of spatial selectors is therefore equal to $$\left(\sum_{k=1}^{\frac{Ce}{Ps}} u_k\right) \cdot P_s.$$

Consider a numerical example of the above proposal where $P_e=L=P_s=8$ and $C_e=C_s=32$; this example therefore relates to an optical switch having eight WDM input fibers and eight WDM output fibers. Each of the input and output fibers carries 32 channels and all the channels are modulated at 10 Gbit/s, so that the total capacity of the switch is 2.56 Tbit/s.

In this case, applying the equation for $u_k$ yields:

$u_4=2$, $u_3=4$, $u_2=2$ and $u_1=8$.

There are therefore two modules $M_4$, four modules $M_3$, and two modules $M_2$ for each output optical fiber, the other eight selection modules M1 being prior art modules. There are 128 selection modules for all the output fibers, whereas the switch depicted in FIG. 1 would have 256 selection modules.

Thus 128 spatial selectors have been saved; each of the spatial selectors comprising eight optical switches, for example, the number of optical gates has therefore been reduced by 1024.

Of course, the invention is not limited to the embodiment that has just been described.

In particular, the semiconductor optical amplifiers used in the spectral and spatial selectors can be replaced by any type of optical switch.

What is claimed is:

1. A selection module for use in an optical signal switch, said module comprising:
   - a spatial selector comprising a plurality of inputs each receiving a wavelength division multiplexed optical signal comprising a plurality of channels each associated with a separate wavelength, and an output delivering a single signal selected from said plurality of wavelength division multiplexed signals; and
   - a plurality of spectral selectors each selecting a channel from a plurality of channels of said signal selected by said spatial selector.

2. The selection module claimed in claim 1, further comprising a first optical coupler having an input connected to said output of said spatial selector and a plurality of outputs each connected to an input of one of said spectral selectors.

3. The selection module claimed in claim 1 wherein said spatial selector comprises:
   - an optical coupler having a number of inputs equal to the number of inputs of said spatial selector and one output, and
   - a plurality of optical switches each associated with one of said inputs of said optical coupler and each having an input that constitutes an input of said spatial selector and an output coupled to said associated input of said second optical coupler.

4. The selection module claimed in claim 3 wherein said optical switches of said spatial selector are semiconductor optical amplifiers.

5. The selection module claimed in claim 1 wherein each of said spectral selectors comprises:
   - a demultiplexer comprising an input receiving said signal selected by said spatial selector and a plurality of outputs,
   - a multiplexer comprising a plurality of inputs and an output supplying the signal associated with a channel selected from a plurality of channels of said signal selected by said spatial selector, and
   - a plurality of optical switches each comprising an input connected to an output of said demultiplexer and an output connected to an input of said multiplexer.

6. The selection module claimed in claim 5 wherein said optical switches of said spectral selector are semiconductor optical amplifiers.

7. The selection module claimed in claim 1 further comprising an optical amplifier for amplifying said signal selected by said spatial selector and having an input connected to the output of said spatial selector.

8. An optical signal switch adapted to receive a plurality of wavelength division multiplex (WDM) input signals and comprising output ports supplying wavelength division multiplexed output signals each comprising a plurality of channels each associated with one wavelength, each of said input signals comprising a plurality of channels each associated with one wavelength, and said switch comprising a broadcast stage comprising optical couplers associated with respective input signals, each optical coupler receiving at its input said associated input signal and broadcasting said signal toward a plurality of output ports, and a selection stage comprising a plurality of outputs, and a plurality of selection modules each having L inputs, said plurality of selection modules comprising means for selecting at one of said outputs one of said channels associated with one of said broadcast input signals, in which switch said selection stage comprises at least one selection module comprising:

a spatial selector comprising a plurality of inputs each receiving a wavelength division multiplexed optical signal comprising a plurality of channels each associated with a separate wavelength, and an output delivering a single signal selected from said plurality of wavelength division multiplexed signals; and a plurality of spectral selectors each selecting a channel from a plurality of channels of said signal selected by said spatial selector.

9. The switch claimed in claim 8 wherein said at least one selection module comprises n outputs each assigned to selecting one channel from a plurality of channels of said signal selected by said spatial selector, where n is an integer greater than 1 and less than $C_e/P_s+1$, where $C_e$ is the number of said channels of said WDM input signal and $P_s$ is the number of said output ports.

10. The switch claimed in claim 8 wherein each of said output ports is associated with $U_k$ of said plurality of selection modules, each module comprising a spatial selector comprising said L inputs each receiving a WDM optical signal comprising a plurality of said channels, an output delivering a single signal selected from said L inputs, and k spectral selectors each selecting one channel from a plurality of channels of said signal selected by said spatial selector, $C_e$ designating the number of said channels of said WDM input signal and being an integer multiple of $P_s$ greater than 1, $P_s$ being the number of said output ports, k varying from 1 to $C_e/P_s$, and $u_k$ being defined by the equation:

$$u_k = E\left(\frac{C_s - v_k - L \cdot (k-1)}{k}\right) + (C_s - v_k - L \cdot (k-1)) modulo[k]$$

where $v_k = v_{k+1} + k \cdot u_k$ and $v_{\frac{C_e}{P_s}} = 0$, the operator E( ) designating the integer part function, and k varying from 2 to $C_e/P_S$.

11. The switch claimed in claim 8 comprising $P_s$ multiplexers each comprising $C_s$ inputs and one output connected to one of said output ports.

* * * * *